United States Patent [19]

Jones

[11] Patent Number: 4,681,396
[45] Date of Patent: Jul. 21, 1987

[54] HIGH POWER LASER ENERGY DELIVERY SYSTEM

[75] Inventor: Marshall G. Jones, Scotia, N.Y.

[73] Assignee: General Electric Company, Schenectady, N.Y.

[21] Appl. No.: 659,125

[22] Filed: Oct. 9, 1984

[51] Int. Cl.⁴ .......................... G02B 6/32; H01S 3/30; B23K 9/00
[52] U.S. Cl. ............................. 350/96.18; 350/96.10; 350/96.15; 350/96.29; 350/96.30; 372/4; 372/6; 372/33; 372/71; 219/121 L; 219/121 LC; 219/121 LD; 219/121 LM; 219/121 LG; 219/121 LJ; 219/121 LK
[58] Field of Search ............... 350/96.10, 96.15, 96.18, 350/96.29, 96.20, 96.21, 96.30; 372/4, 6, 40, 69, 70, 71, 72, 33; 219/121 L, 121 LB, 121 LA, 121 LC, 121 LD, 121 LE, 121 LF, 121 LG, 121 LK, 121 LN, 121 LR, 121 LU, 121 LY

[56] References Cited

U.S. PATENT DOCUMENTS

| | | | |
|---|---|---|---|
| 3,382,343 | 5/1968 | Muncheryan | 219/121 LA |
| 3,404,350 | 10/1968 | Muncheryan | 219/121 LA |
| 3,622,743 | 11/1971 | Muncheryan | 219/121 LA |
| 3,633,126 | 1/1972 | Martin et al. | 331/94.5 |
| 3,786,907 | 1/1974 | Muncheryan | 372/33 X |
| 3,843,865 | 10/1974 | Nath | 219/121 L |
| 4,214,216 | 7/1980 | Jones, Jr. | 372/70 X |
| 4,398,790 | 8/1983 | Righini et al. | 350/96.18 |
| 4,443,684 | 4/1984 | Sakuragi et al. | 219/121 LH |
| 4,521,070 | 6/1985 | Sottini et al. | 350/96.15 |
| 4,564,736 | 1/1986 | Jones et al. | 219/121 L |
| 4,641,912 | 2/1987 | Goldenberg | 350/96.15 X |

FOREIGN PATENT DOCUMENTS 55-153327  1/1980  Japan ............................. 350/96.18

OTHER PUBLICATIONS

Nath, "Handheld Laser Welding of Metals Using Fibre Optics", Optics and Laser Tech., 10/74, pp. 233–235.
W. B. Jones, "The Slab Geometry Laser", *Laser Focus-/Electro Optics*, vol. 19, No. 9, Sep. 1983.
M. G. Jones and G. Georgalas, "Low Divergence Beam Processing with a 1.06 Micrometer Total Internal Reflection Face Pumped Laser", *Laser News*, vol. 6, May 1984.

*Primary Examiner*—William L. Sikes
*Assistant Examiner*—Brian M. Healy
*Attorney, Agent, or Firm*—Donald R. Campbell; James C. Davis, Jr.; Paul R. Webb, II

[57] ABSTRACT

A low-divergence 1.06 micrometer wavelength beam from a total-internal-reflection, face-pumped laser (TIR-FPL) is focused onto the end of a quartz optical fiber to a spot having a size smaller than the fiber diameter and with a beam cone angle less than twice the numerical aperture of the fiber. The fiber transmits the energy to emerge at the other end where it is collimated and focused onto material to be processed. A laser average output power level greater than 400 watts can be transmitted through an optical fiber having a diameter less than 600 micrometers.

3 Claims, 4 Drawing Figures

HIGH POWER LASER ENERGY DELIVERY SYSTEM

BACKGROUND OF THE INVENTION

The present invention relates to systems and methods for the delivery of high power laser energy particularly for material processing operations such as heat treating, metal surfacing (e.g. alloying and cladding), welding, drilling, and cutting, as well as other machining operations.

Typically, laser beam delivery for material processing is accomplished by means of an ensemble of mirrors and prisms for beam steering. Mechanical constraints in a typical system impose practical limitations on the degree of beam steering available. Moreover, there are conflicting design requirements relating to the focal length of the focusing lenses employed: A relatively longer focal length lens allows the workpiece to be placed farther from the lens thus reducing the likelihood of damage to the lens system due to splattering. However, a longer focal length lens also increases the focused spot size, decreasing the available energy intensity.

Accordingly, fiber optic laser energy delivery systems have been developed whereby laser energy in the near infrared and visible spectrum is passed through a single optical fiber at power levels sufficient for material and metal processing. With an optical fiber which is basically light in weight, the laser beam may be moved in almost any direction at a rapid speed, for example by robotic control. In short, a fiber optic delivery system substantially increase the degrees of freedom of laser beam manipulation. Such systems are disclosed in commonly-assigned U.S patent application Ser. No. 450,951, filed Dec. 20, 1982, now abandoned, by M. G. Jones and G. Georgalas entitled "Laser Material Processing Through A Fiber Optic", and continuation application Ser. No. 714,660 filed Mar. 21, 1985, and in commonly-assigned application Ser. No. 608,042, filed May 7, 1984, by M. G. Jones, now U.S. Pat. No. 4,564,736 entitled "Industrial Hand Held Laser Tool and Laser System". The entire disclosures of application Ser. Nos. 450,951 and 608,042 are hereby expressly incorporated by reference.

As disclosed in those applications, beams from lasers such as 1.06 micrometer Nd:YAG and Nd:glass lasers, as well as 680 nanometer beams from ruby lasers and 630–730 nanometer beams from alexandrite lasers can be coupled to an optical fiber such that the laser energy enters the fiber, and is transmitted thereby. Using the systems described, average power levels of up to 200 watts can be transmitted through optical fibers. The shorter wavelengths of these particular lasers are preferable to the 10.6 micrometer wavelength of carbon dioxide lasers since laser spot size is proportional to laser wavelength. For equal power levels, a shorter wavelength laser in general provides a hotter focused beam, allowing the cutting of thicker material, at faster cutting rates.

There are a number of factors which must be taken in account when coupling a laser beam into an optical fiber. If the coupling is not highly efficient, then energy is released in the form of heat at the input end of the optical fiber, thereby destroying it.

In general, coupling requires that the laser beam be focused to a spot whose diameter is less than the optical fiber or, more particularly, the core thereof. (As employed herein, the term "optical fiber" is intended to mean that element of a fiber optic which actually carries the light beam, i.e., the core, and not the cladding and protective shielding.) At the same time, in order to ensure proper internal reflection during fiber optic transmission, the included angle of the focused beam must be less than twice the numerical aperture (NA) of the fiber. Numerical aperture is the sine of the half-angle over which an optical fiber can accept light rays, multiplied by the index of refraction of the medium containing the rays (which is 1.0 for air). For typical fibers, this included angle of the focused beam must be less than approximately 20° to 24°.

There remain problems when attempting to transmit as much power as possible through a fiber having a diameter as small as possible. Prior to the present invention, the smallest fiber optic cable used when power levels exceed 100 watts was approximately 600 micrometers in diameter. Coupling 100 watts or more of 1.06 micrometer wavelength laser energy into a smaller diameter fiber becomes difficult because the focused spot size is too large. The flexibility of the 600 micrometer diameter fiber optic is limited to an approximately four-inch bend radius, which can be a limiting factor.

More particularly, in the design of systems for coupling laser energy into the end of a fiber optic, there are conflicting requirements. In particular, shorter lens focal lengths allow the focused spot size to be reduced; thus the spot can be focused on a smaller diameter optic fiber. However, at the same time, the shorter lens focal length leads to a greater cone angle. If the cone angle of laser energy entering the optical fiber becomes too great, then internal reflections within the optical fiber will not be total, and energy will escape through the walls of the optical fiber. For longer lens focal lengths, the spot size eventually becomes too large, and the maximum focal length is limited for this reason. Thus, for a given maximum entrance cone angle for a given fiber, the lens must have a focal length no less than a predetermined minimum.

Also, focused spot size is directly proportional to the product of the focal length of the focusing lens and the divergence of the laser beam. Thus, for a known fiber diameter and beam divergence, the lens focal length can be no greater than a predetermined maximum.

The divergence of typical rod lasers limits their ability to focus to small spot sizes sufficient to enter fiber with diameters less than 500 micrometers. As the power output level of the 1.06 micrometer wavelength laser increases (up to 400 watts), the beam divergence also increases. For example, 100 watts of laser power can be transmitted through a 800 micrometer fiber, but transmission problems occur when the power level is increased to 400 watts. The problems occur because of larger spot sizes resulting from the increasing divergence.

SUMMARY OF THE INVENTION

Accordingly, it is an object of the invention to provide systems and methods for transmitting visible and low infrared (e.g. 1.06 nanometer laser energy) through a fiber optic cable having a diameter less than 600 micrometers (for example, 300 micrometers) at a power level greater than 400 watts.

It is another object of the invention to provide a fiber optic laser energy delivery system having power densities sufficient for material processing.

Briefly, in accordance with the invention a total-internal-reflection, face-pumped laser (TIR-FPL) is combined with a focusing lens for focusing the laser beam onto one end of an optical fiber. The face-pumped laser generates a lower divergence beam then a typical rod laser, allowing the conflicting requirements to be met.

More particularly, a laser energy delivery system in accordance with the invention includes a total-internal-reflection, face-pumped laser (TIR-FPL) for producing a near infrared or visible wavelength laser beam. Preferably, the TIR-FPL includes a laser slab of yttrium aluminum garnet doped with neodymium and generates laser energy at a wavelength of 1.06 micrometers.

The system also includes an optical fiber having a given diameter and numerical aperture, and serving as a light guide. At least one focusing lens is provided for focusing the beam on one end of the fiber to a spot having a size smaller than the fiber diameter and with a beam cone angle less than twice the numerical aperture of the fiber such that the fiber transmits laser energy to emerge at the other end. An optical system is coupled to the other end of the fiber for focusing the emerging laser beam onto material to be processed. In preferred embodiments, the optical fiber has a diameter less than 600 micrometers and the laser average output level is greater than 400 watts.

A method of delivering laser energy in accordance with the invention includes the steps of employing a total-internal-reflection, face-pumped laser (TIR-FPL) to generate a near infrared or near visible wavelength laser beam, focusing the laser beam to a spot onto one end of an optical fiber, with a spot size smaller than the fiber diameter and with a laser beam cone angle less than twice the numerical aperture of the fiber such that the fiber transmits laser energy to emerge at the other end, and refocusing the emerging beam onto material to be processed.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

DETAILED DESCRIPTION

Figure 1:
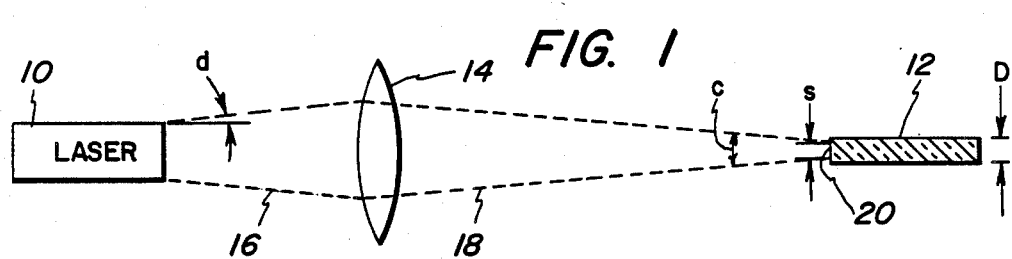
FIG. 1 depicts several conflicting optical design factors which must be taken into account to successfully couple high-power laser energy into a single optical fiber.

Referring first to FIG. 1, depicted are various design parameters and factors which must be considered in order to successfully couple energy from a laser 10 into an optical fiber core 12 employing an intermediate lens system represented by a single focusing lens 14. In FIG. 1, the beam exiting the laser 10 is represented by rays 16 which are characterized by a divergence d expressed in angular units (e.g. milliradians). The rays 16 are refracted by the lens 14 to emerge as rays 18 which are focused to a spot 20 having a diameter s on the end of the optical fiber 12. The optical fiber has a diameter D. For successful coupling, the spot diameter s must be less than D. In addition, in order for energy entering the optical fiber 12 to be transmitted thereby by total internal reflection within the optical fiber 12, the included angle c of the focused beam 18, i.e. the cone angle, must be less than two times the numerical aperture (NA) of the fiber 12.

As is known, the spot size s is proportional to the product of the lens 14 focal length and the laser beam divergence d. The cone angle c is inversely related to the lens 14 focal length. Thus, for a given fiber 12 having a maximum permitted cone angle c, the focal length of the lens 14 must be at least as long as a given minimum. At the same time, the maximum focal length of the lens is limited by the spot size s and beam divergence d.

Thus, to employ fibers with diameters D as small as 200 micrometers, a low divergent (e.g. one milliradian) laser beam is required. In accordance with the invention, it is recognized that a TIR-FPL can satisfy these conflicting requirements in that the TIR-FPL is capable of generating a high-power laser beam at 1.06 micrometers with a beam divergence less than one milliradian.

A TIR-FPL laser is described in detail in commonly-assigned Martin U.S. Pat. No. 3,633,126, the entire disclosure of which is hereby expressly incorporated by reference. TIR-FPLs are also described in W. B. Jones, "The Slab Geometry Laser", *Laser Focus/Electro-Optics*, Volume 19, Number 9, September 1983; and M. G. Jones and G. Georgalas, "Low Divergence Beam Processing With A 1.06 Micrometer Total Internal Reflection Face Pumped Laser", *LASER NEWS*, Volume 6, May 1984.

Figure 3:
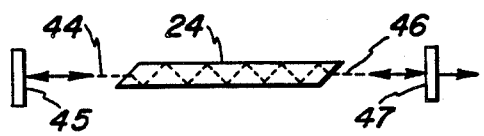
FIG. 3 is a view taken along line III—III of FIG. 2 showing a side view of the laser slab in the FIG. 2 TIR-FPL.
Figure 2:
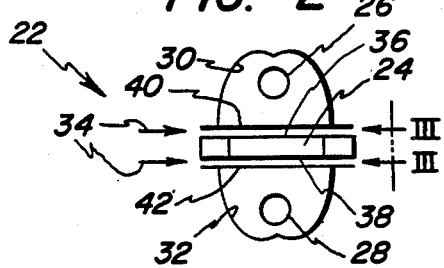
FIG. 2 is a highly schematic depiction of the cross-section of a total-internal-reflection, face-pumped laser (TIR-FPL)

With reference to FIGS. 2 and 3, such a laser is represented schematically and generally designated 22. Briefly, a suitable laser slab 24 is provided, such as yttrium aluminum garnet (YAG) doped with neodymium. The neodymium 3+ ion can be pumped with flashlamps, such as flashlamps 26 and 28, for continuous wave (CW), pulsed, or Q-switched operation.

With an optically pumped solid-state material, heating of the host material occurs concomitant with inversion pumping. This heating, associated with pumping, occurs approximately uniformly throughout the laser material volume. On the other hand, thermal gradients in a solid-state laser arise principally from cooling. A general problem in using solid-state lasers is their susceptibility to thermal distortion, which is especially evident in the rod geometry. The slab geometry configuration alleviates this problem by compensating for the effect of thermal distortion by the symmetry of thermal gradients in the laser beam path.

In FIG. 2, the laser slab 24 is pumped by the pair of flashlamps 26 and 28 backed by suitable reflectors 30 and 32 to achieve uniform pumping distribution across the width of the slab 24. Cooling fluid represented by arrows 34 flows through channels 36 and 38 to cool the two faces of the slab 24. In FIG. 2, the channels 36 and 38 are bounded by transparent windows 40 and 42 which serve to confine the coolant flow, while at the same time permitting excitation of the slab 24 by the flashlamp 26.

As depicted in FIG. 3, a laser beam 44 reflecting off of a totally reflective mirror 45 enters the slab 24 at the proper angle to be guided by total-internal-reflection through the slab in a zig-zag path that can be as long as needed for the required gain, and emerges at 46 in amplified form where it passes through a partially reflective mirror 47. Alternatively, the TIR-FPL 22 can be operated in an oscillator mode.

The face-pumping and cooling arrangement of FIGS. 2 and 3 makes possible the uniform pumping that is required to avoid thermal distortion over the slab width. The cooling temperature gradient in the slab is perpendicular to the faces and symmetrical with respect to the center plane of the slab. Thus, distortion resulting from the temperature gradient is compensated for by each traverse of a beam between the surfaces, as shown in FIG. 3.

Figure 4:
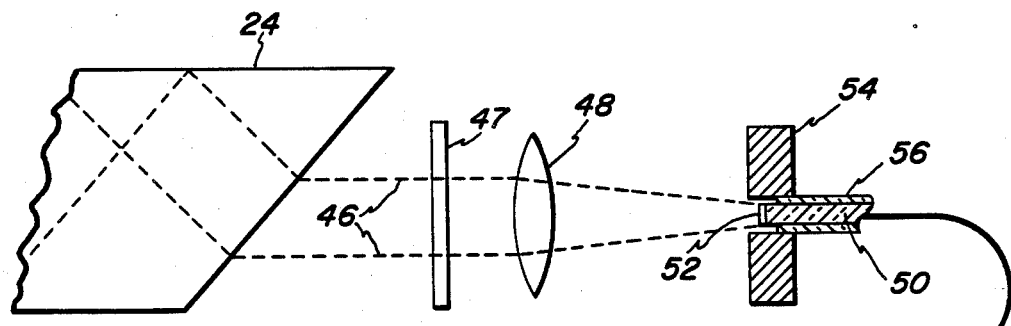
FIG. 4 is a diagram of a laser energy delivery system in accordance with the invention.
Figure 4:
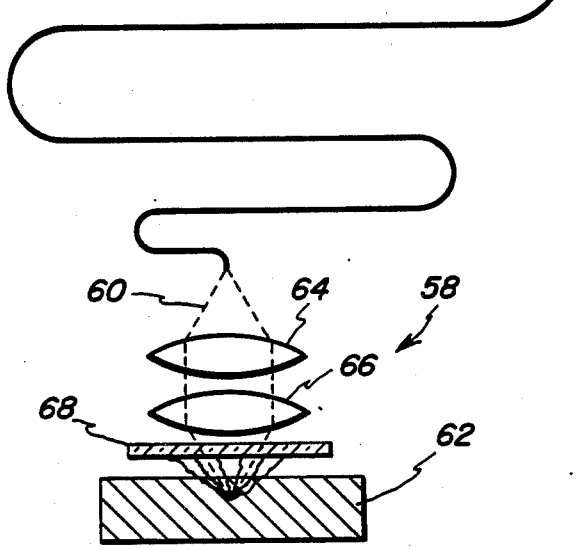

With reference now to the laser energy delivery system of FIG. 4, the TIR-FPL is represented by the slab 24, from which the low-divergent high power laser beam 46 emerges. An optical system including at least one focusing lens 48 focuses the beam 46 onto the end of a quartz optical fiber core 50. The end of the core is ground optically flat and can have an anti-reflection coating 52. A suitably apertured holding fixture 54 holds the end of the core in position, and optical fiber cladding 56 (e.g., silicon) is stripped away from the end of the core.

Coupled to the other end of the fiber 50 is an optical system 58 for focusing the emerging laser beam 60 onto material 62 to be processed. Although shown as a system of lenses, it will be appreciated that the optical system 58 can comprise an optically-ground curved surface on the end of the optical fiber 52 itself.

The optical system 58 includes a lens 64 for collimating the beam 60, and a refocusing lens 66 for actually focusing the beam on the workpiece 62. In order to protect the optical system 58 from metal vapor and splatter, an intermediate glass plate 68 may be provided. In typical applications, the entire optical system 58 is carried and directed by a robot arm (not shown).

While the optical fiber 52 may have any convenient diameter, e.g., 1000 micrometers, for mechanical flexibility the diameter is smaller than 600 micrometers. A typical diameter would be 300 micrometers.

In view of the foregoing, it will be appreciated that the invention increases the degrees of freedom of neodymium laser beam steering and the amount of average and peak power transmitted through an optical fiber. Passing higher powers through thinner fibers enhances the dexterity and metal working capability of neodymium lasers when integrated with process robots.

While a specific embodiment of the invention has been illustrated and described herein, it is realized that numerous modifications will occur to those skilled in the art. It is therefore to be understood that the appended claims are intended to cover all such modifications and changes as fall within the true spirit and scope of the invention.

What is claimed is:

1. An improved high power laser energy delivery system comprising:
   a solid-state total-internal-reflection face-pumped laser for producing a near infrared or visible wavelength laser beam which has an average power output level greater than 400 watts and a beam divergence less than one milliradian;
   a single fiber optic serving as a light guide and having a diameter less than 600 micrometers and a given numerical aperture;
   at least one focusing lens having a given focal length and which focuses said laser beam on one end of said fiber optic to a spot having a size smaller than the fiber diameter, where spot size is proportional to the product of lens focal length and laser beam divergence, and with a beam cone angle less than twice said numerical aperture so that laser energy entering said fiber is transmitted by total internal reflection to emerge at the other end; and
   an optical system coupled to the other end of said fiber to focus the emerging laser beam onto material to be processed.

2. The system of claim 1 wherein said fiber diameter is less than 300 micrometers.

3. The system of claim 1 wherein said laser is comprised of a laser slab of neodymium-doped yttrium aluminum garnet.

* * * * *